United States Patent Office 3,392,100
Patented July 9, 1968

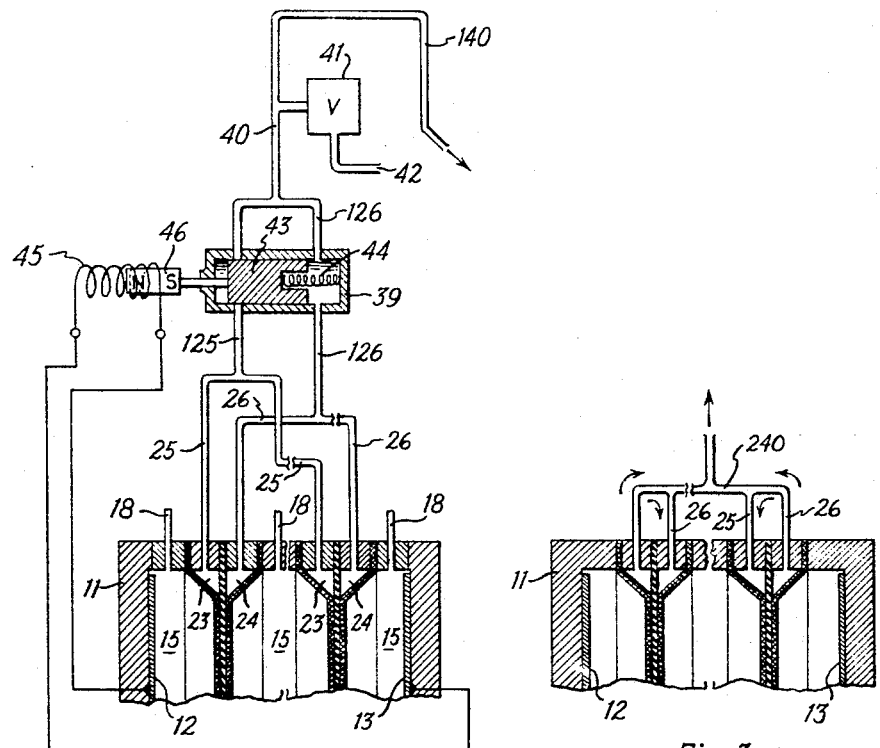
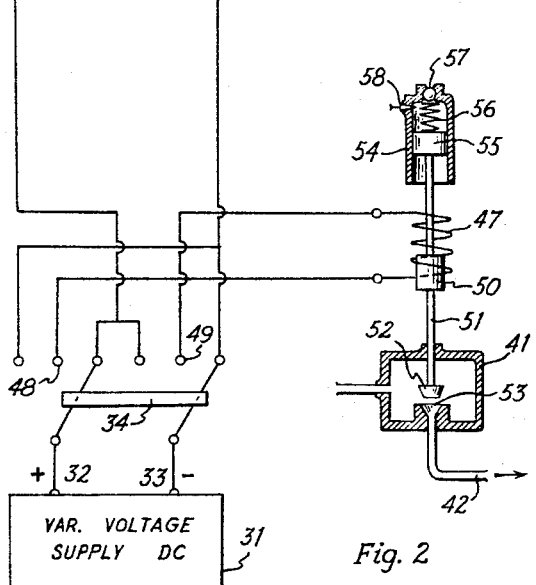
Fig. 3
Fig. 2
INVENTOR.
Paul Kollsman

3,392,100
METHOD OF, AND APPARATUS FOR, PRODUCING DEIONIZED PRODUCT LIQUID BY DIFFERENTIAL SOLVENT TRANSFER THROUGH MEMBRANES
Paul Kollsman, 100 E. 59th St., New York, N.Y 10022
Filed Oct. 22, 1964, Ser. No. 405,756
17 Claims. (Cl. 204—180)

This invention relates to improvements in methods, practices, and apparatus for changing the ionic concentration of liquids by electrodialysis and has particular application to those methods, practices and apparatus based on the principle of transferring ions and accompanying solvent through a succession of membranes passing ions and solvent in different proportions.

My earlier applications Ser. No. 187,747, filed Apr. 16, 1962, now Patent 3,309,301 dated Mar. 14, 1967, and Ser. No. 187,700, filed Apr. 16, 1962, now abandoned, disclose the method of producing a highly dilute product liquid by passing, by the action of an electric current, ionic solution in which the solvent, such as water, is present in excess of the level of solvation or hydration from one chamber first through a membrane having a low ion-to-solvent transfer ratio into a second chamber and then passing the same ions, but less accompanying solvent, through a second membrane having a high ion-to-solvent transfer ratio into a third chamber.

The first membrane may be called a filter membrane and it is desirable to select a fine-pored material for this purpose, for example in order to filter out bacteria, and the second membrane is a tighter membrane, i.e., a membrane of smaller pore size than the first. Preferably a membrane of ion exchange material is selected for this purpose.

The described method permits a high degree of deionization to be obtained in one step, as demonstrated by the following example. Water of an initial resistivity of 240 ohms cm. may be deionized to a resistivity of 180,000 ohms cm., or from 2,600 ohms cm. to 1,200,000 ohms cm. by a single pass through the apparatus.

Experience has shown that after long periods of operation the productivity of a differential solvent cell diminishes somewhat, but I discovered that such diminution of productivity can be remedied by a sequence of certain method steps as well as a certain arrangement or grouping of membranes, subjection of the membranes to periodic current reversal, application or maintenance of certain hydrostatic pressure inequalities, collection of product liquid by certain means and in a certain manner. As a result the original productivity of a cell or apparatus can readily be restored without a removal or replacement of membranes, making the cell either as a single unit or as a multiple unit containing a great number of membrane groups suited for continuous operation.

The various objects, features and advantages of this invention will appear more fully from the detailed description which follows accompanied by drawings showing, for the purpose of illustration, preferred forms of apparatus for practicing the invention. The invention also resides in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and manners in which it may be carried out may be better understood by referring to the following detailed description taken in connection with the accompanying drawings forming a part of it in which:

FIGS. 2 and 3 illustrate alternative product liquid withdrawal means for the apparatus of FIG. 1;

Figure 1:
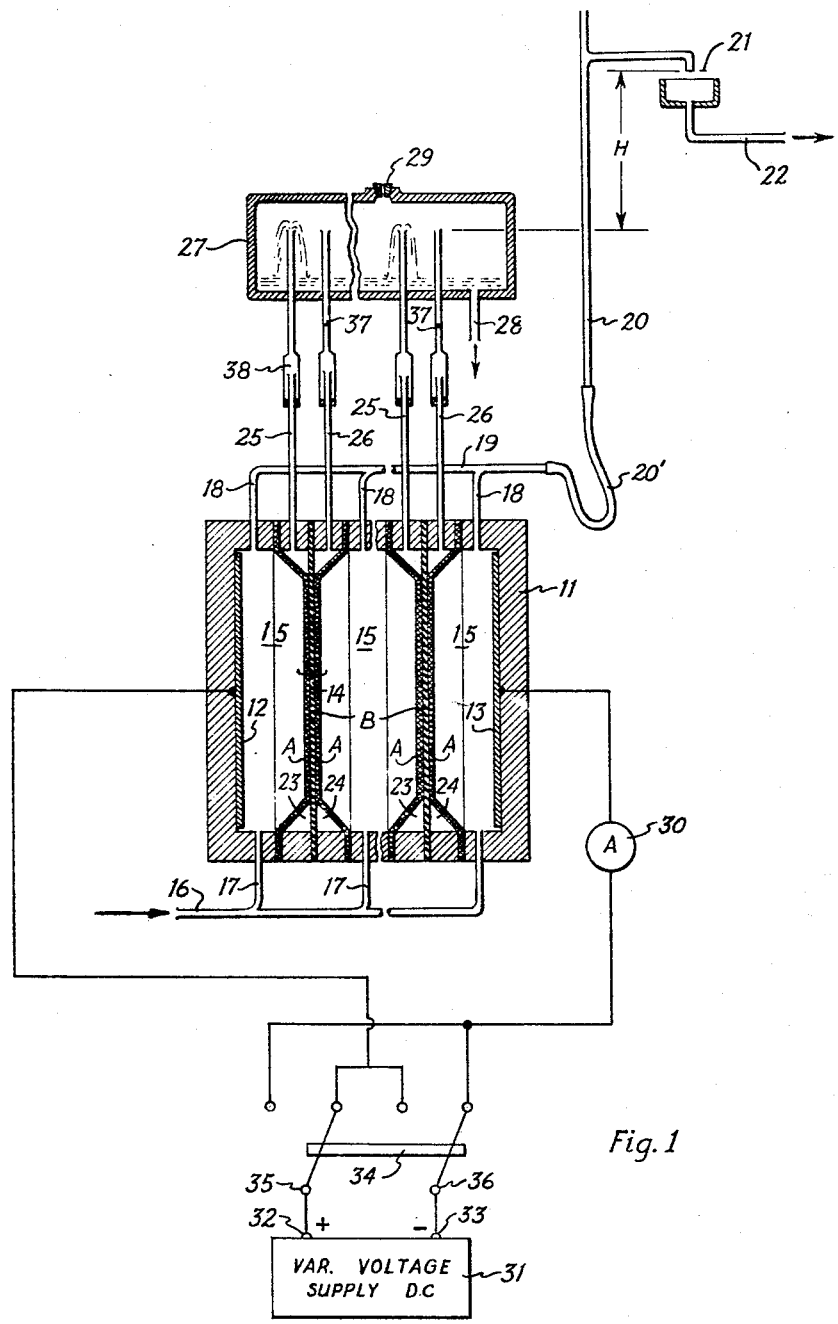
FIG. 1 is a diagrammatic illustration of a cell comprising a plurality of membrane groups.
Figure 4:
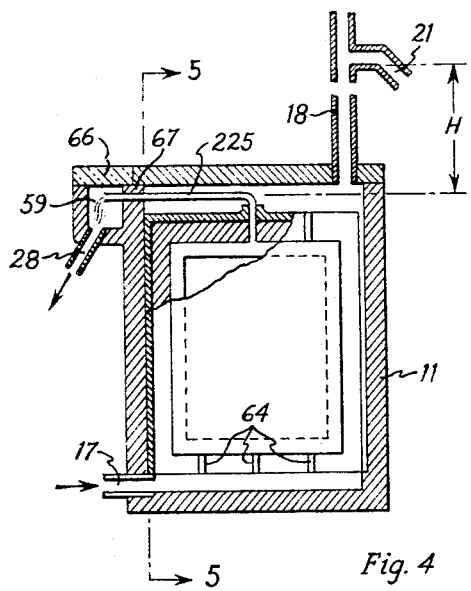
FIG. 4 is an elevational side view partially in section of a multi-unit cell embodying the present invention, the section being taken on line 4—4 of FIG. 5.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction of the invention for the purpose of explanation of broader aspects of the invention, but it is understood that structural details may be modified in various respects without departure from the principles of the invention, and that the invention may be incorporated in other structural forms than shown.

The apparatus shown in FIG. 1 comprises a housing 11 in which terminal electrodes 12 and 13 are installed. The housing 11 further contains a plurality of membrane groups generally designated 14, two such groups being shown in detail, the break in the housing indicating that a plurality of such groups, 50 or 100 for example, may be contained in a common housing.

The membrane groups comprise membranes of two kinds, which for convenience may be referred to as A and B membranes, the arrangement being such that a B membrane is sandwiched or arranged between two A membranes so that the order of A–B–A–A–B–A . . . results from electrode 12 to electrode 13.

The membrane A is basically a fine pore membrane capable of passing ions with a relatively large accompanying volume of solvent. The membrane B is basically a selectively permeable membrane of ion exchange material capable of passing ions of one polarity and resisting passage of ions of the opposite polarity and passing the ions of said one polarity with a relatively small volume of solvent, smaller than the volume of solvent transferred by the ions when passing through the A membrane.

The A membrane may for convenience be referred to as a filter membrane as its principal function is the filtering out of impurities including bacteria aside from its function to form a semi-permeable wall of a cell chamber or cell space within which a certain hydrostatic pressure may be built up in order to permit liquid accumulating in the space to be discharged therefrom under a certain pressure generated within the space.

Examples of A and B type membranes will be given further below.

The A membranes may be neutral or may possess relatively weak permselective properties imparted, for example, by sulfonation or ammination, but the ionic concentration of its pore liquid must be less than that of the B membrane with which they are grouped.

The B membranes are preferably of rigid construction, or, if flexible, are installed under tension while the A membranes are preferably flexible in order that they may, under the influence of an imbalance in pressures, be urged into or towards physical contact with the A membranes.

The B membranes are of a smaller effective pore size than the A membranes. As shown by examples given below, the B membranes may be neutral membranes capable of passing ions of both polarities, but are preferably ion exchange membranes as the latter generally are of a smaller effective pore size, hence capable of passing ions accompanied by a relatively small volume of solvent.

The grouping of the A and B membranes results in the formation of three types of chambers in the housing. Raw liquid chambers 15 are those chambers or spaces before, in back of, or between, the groups 14, and ionic solution from which solvent is to be extracted is conducted into these chambers or spaces 15 by a supply duct 16 having branches 17.

Liquid discharged from the spaces 15 leaves through branches 18, a collecting duct 19 and a line 20 rising to a level 21 to indicate that a certain hydrostatic pressure prevails in the chambers or spaces 15 which tends to urge the A membranes towards or against the B membranes. The level difference is indicated as H and for experimental purposes is preferably made variable, for example by inserting a piece of flexible tubing in line 20 to permit its discharge end 21 to be raised or lowered.

The level 21 is shown as an overflow level or duct from which the solution then passes into a discharge or disposal duct 22.

Two further chambers or spaces 23 and 24 are defined by the A and B membranes. Assuming electric current, i.e., ions, pass from the left electrode 12 to the right electrode 13, spaces 23 become product spaces and spaces 24 become non-producing spaces, as will later be explained. If the electric current (i.e., ions) moves in the opposite direction, spaces 24 become product spaces and spaces 23 become non-productive.

Discharge ducts 25 and 26 extend from the spaces or chambers 23 and 24 to a collecting means 27, shown for convenience of illustration as being a tank, located above the level of the cell housing so as to require hydraulic pressure within the spaces 23, 24 to effect a discharge of liquid. Collected product is withdrawn through a duct 28 from the tank 27. A porous plug 29 may be provided to seal the tank 27 against impurities, but not against the atmospheric or surrounding pressure.

It will be noted that the level 21 exceeds the elevation of the ends of the ducts 25, 26 by H. This is a convenient arrangement to insure that the A membranes of producing spaces are urged towards physical contact with the B membranes.

An ammeter or milliammeter 30 permits determination of the electric current flowing through the apparatus as a result of application of a direct electrical potential from a variable voltage source 31 having a positive and a negative terminal 32 and 33, respectively. A reversal switch 34 with input posts 35, 36 permits reversal of the electrode polarity of the cell.

The practice of the novel method by means of the apparatus of FIG. 1 may be as follows:

It shall be assumed that the B membranes are cation membranes, passing positive cations in their travel toward the negative cathode 13 and resisting the passage of anions in the opposite direction.

Cations with accompanying large amounts of solvent (sometimes referred to in the art as accompanying "solvent shells") pass the A membranes from the raw solution spaces 15 and encounter the permselective B membranes which pass the cations but force them to leave a portion of the accompanying solvent volume behind, which accordingly accumulates in the spaces 23 and causes a certain hydrostatic pressure to build up therein.

This pressure causes the solvent product to flow out through, and overflow, the product discharge ducts 25 into the tank. The pressure building up in the spaces 23 is generated at each portion of the A membrane through which ions pass, which accordingly tends to lift itself off from the B membrane.

This tendency of the membranes A and B to become separated is counteracted by the predominant hydrostatic pressure in chambers or spaces 15 due to the head H. As a result the product liquid film between the membranes A and B remains extremely thin.

The ions emerging from the B membranes in their travel to the right enter the chambers 24 with a relatively small solvent shell and seek to pick up solvent in the spaces 24 before they pass through the second A membrane to the right of the B membrane of the group and enter the next raw solution space 15. As a result a lower pressure prevails in the spaces 24 which is indicated by the level or meniscus 37 in ducts 26 which at this moment do not discharge liquid into the tank 27.

After an extended period of operation, such as 24 or 36 hours, or even longer, the volumetric output of the apparatus may decrease, presumably the result of partial clogging of the A membranes bordering the product spaces 23. The polarity of the apparatus is then reversed. Spaces 24 then become producing spaces and discharge product into the collecting tank 27 through ducts 26. Spaces 23 become non-producing as the liquid level in their ducts 25 drops.

The reversal restores the left A membranes to their original condition. In the meantime production proceeds from spaces 23 until the condition of the right A membranes deteriorates sufficiently to require another reversal of the polarity in order to recondition the right A membranes and produce from spaces 23.

The hydrostatic pressure generated in the producing spaces is a function of the applied DC potential and/or the current.

The apparatus may safely be overloaded temporarily in order to increase the volumetric production rate. Curiously, such overloading results in a product of a higher degree of purity, i.e., higher deionization, but at somewhat lower electrical economy. An adjustment of the height of the ends of the overflow tubes 25, 26 may be provided for such operating conditions and also in order to adjust the apparatus for different current densities. A height adjustment is shown by means of telescoping tubes at 38. Alternatively, a hose connection may be provided between the upper portions of the tubes 25, 26 and the housing 11.

It will be noted that current reversal in the apparatus of FIG. 1 is accompanied by a slight contamination (ionic, but not bacteria) due to the fact that the contents of the non-producing chambers 24 and their ducts 26 are discharged into the tank 27 after reversal. If the volumetric capacity is maintained small the contamination may be tolerable.

Nevertheless, means may be provided for automatically discarding a portion of the product after reversal. This and other features are illustrated in FIG. 2.

The ducts 25 and 26 discharge into collecting ducts 125 and 126, respectively, leading to a solenoid valve 39 which automatically shuts off the non-producing duct 125 or 126. The outflow ducts 125' and 126' above the valve 39 lead to a common product duct 40. A quick-action-slow return valve 41 is actuated by each reversal and immediately upon reversal discharges product liquid arriving from ducts 125' or 126' through a duct 42 to a suitable point of disposal. After a certain period of time of the order of minutes the valve 41 closes and product then passes through duct 40 and its continuation 140 to a point of consumption.

Turning now to details, the valve 39 comprises a valve member 43 normally maintained in the right position in which it closes the passage 126, 126' by the action of a spring 44. A solenoid winding 45 acts on a polarized armature 46 which in the illustrated condition is attracted by the solenoid 45 whose south pole S attracts the north pole of the armature 46. When the current is reversed, the polarity of the solenoid is reversed, the spring 44 pulls the valve member 43 to the right. The passage 126, 126' is then closed and the passage 125, 125' is opened.

The valve 39 makes it unnecessary to depend on changing liquid levels for the stoppage of discharge from the non-producing spaces.

The quick action valve 41 comprises a solenoid 47 which is actuated by additional contacts 48, 49 of the reversing switch 34 every time the switch is reversed. The solenoid 47 acts on an armature 50 on the stem 51 of the valve member 52 which is lifted off its seat 53 when the solenoid is energized. Liquid is then discharged by the open valve through passage 42.

The valve is maintained open by a dash pot arrangement comprising a dash pot 54 and a piston 55 therein. A spring 56 normally urges the valve into closing position. A check valve 57 vents the interior of the dash pot quickly during upward motion of the piston and a bleeder passage 58 permits the piston to return slowly to its lower, valve closing position. The bleeder passage may be made adjustable by a needle valve, for example, to permit variation in the return stroke timing.

The valve 41 is so timed as to permit all contaminating liquid to be discharged after each reversal of polarity.

FIG. 3 illustrates a particularly simple manifold arrangement in which all ducts 25 and 26 lead to a single manifold duct 240.

In its operation product passes into the duct 240, depending on whether ducts 25 or ducts 26 supply product. A condition of suction prevails at the ends of the ducts of the non-producing spaces, and a small portion of the produced volume of dilute product is sucked back into the non-producing spaces. In many instances such loss is tolerable.

Figure 5:
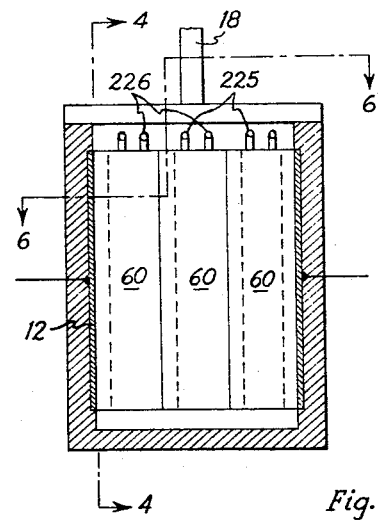
FIG. 5 is a front elevation partially in section of the cell shown in FIG. 4, the section being taken on line 5—5 of FIG. 4.
Figure 6:
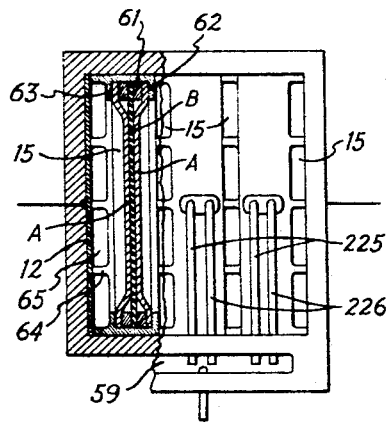
FIG. 6 is a top view, partially in section of the cell of FIGS. 4 and 5, the section being taken on line 6—6 of FIG. 5 to illustrate the membrane unit package arrangement.

In the arrangement shown in FIG. 5 many membrane groups are housed in a common housing comprising the terminal electrodes. Each group is provided with its own product discharge ducts or risers 225 and 226 which may consist of plastic tubing and which discharge into a common collecting trough 59.

The advantage of this arrangement is that each group may be constructed as an individual exchangeable unit whose proper functioning is readily observable by observation and, if necessary, testing of its product. In case of malfunction of a group the unit is readily replaced.

Each unit 60 is composed of three membranes A, B, A peripherally spaced by spacers 61. The assembly is held together by a peripheral mounting rim 62 of rubber or resilient plastic material comprising face flange portions 63 and spacers 64 providing spaces 65 through which liquid may pass into and out of the chambers 15.

The functioning of the individual membrane groups may be observed through a transparent cover portion 66 of the trough.

In the event of malfunctioning of, or damage to, one membrane group the entire group or unit 60 is easily removed and replaced. In this connection the flexible ducts 225, 226 are pulled out of the respective holes in the wall 67 of the housing 11 adjacent the trough and upon insertion of a replacement group 60 its ducts are reinserted through the holes in the wall.

Figure 7:
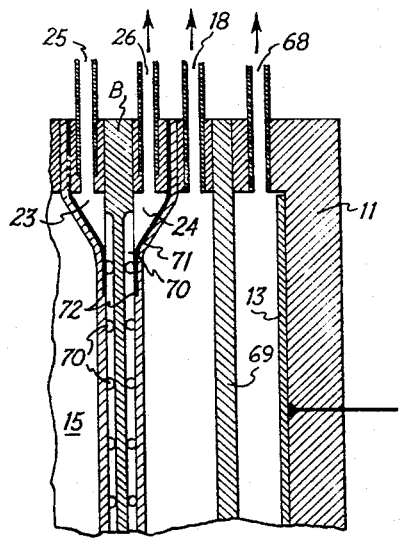
FIG. 7 is a sectional view showing certain optional structural details.

As shown in FIG. 7 the electrodes may be mounted in closed electrode chambers provided with appropriate inflow and outflow ducts, one such duct being shown at 68. The electrode chamber is separated from the remainder of the interior of the housing by a membrane 69, preferably a permselective membrane.

The B membrane is shown as having surface channels 70 impressed in its surfaces, which facilitate removal of the product surface film which forms along the face of the B membrane.

The peripheral area of the filter membranes A is preferably made liquid impermeable for example by impregnation with a suitable lacquer or by means of a liquid tight sheet 71, the central portion of which is cut out in window fashion to permit the A and B membranes to assume positions of physical contact. The peripheral rim portion of the sheet extends far enough to permit the edge 72 of the window to be clamped between the contacting membranes.

Thus arranged the sheets 71 prevent liquid from filtering through the peripheral marginal portions of the A membranes from the chambers 15 into the spaces 23 and 24.

MEMBRANES

Suitable filter membranes and ion selective membranes are presently commercially available from many sources.

Filter membranes.—The filter membranes may be divided into two groups, inherently hydrophilic filter membranes and inherently hydrophobic filter membranes. Filter membranes may be treated to impart to them certain desirable characteristics, for example in order to make a hydrophobic membrane hydrophilic.

Many hydrophilic filter membrane materials are cellulose and cellulose derivatives. They are available in a wide range of pore sizes. Some membranes are reinforced by filaments, e.g. nylon for greater physical strength.

"Ultraflex" filter membranes were tested in pore sizes ranging from less than 5 m$\mu$ (UA superdense) to 400 m$\mu$ (A coarse). The best results were obtained with membranes of the range between 100 m$\mu$ (UA coarse) and 250 m$\mu$ (A medium).

"Millipore" filter membranes were tested in pore sizes ranging from 10 m$\mu$ (VF) to 5$\mu$ (SM), specific sizes being as folows: VF 10 m$\mu$; VM 50 m$\mu$; VC 100 m$\mu$; GS 220 m$\mu$; PH 300 m$\mu$; HA 450 m$\mu$; WH 450 m$\mu$ (nylon reinforced); WS 3$\mu$ (nylon reinforced); SM 5$\mu$. The best results were obtained in the range of pore sizes from 100 m$\mu$ and 450 m$\mu$.

For the treatment of solvents containing organic solvents filter membranes are available made of materials which resist such solvents.

"Ultraflex" membranes were tested in a range of pore sizes from less than 5 m$\mu$ (UO superdense) to 400 m$\mu$ (O coarse). The best results were obtained with a membrane of 250 m$\mu$ pore size (O medium).

"Millipore" membranes are also available in a composition resisting organic solvents. The following were tested: OH 1.5$\mu$; OS 10$\mu$. These membranes consist of polyethylene. The OH membrane was found most satisfactory.

The membrane was also subjected to a chemical surface treatment to impart certain ion exchange properties to it resulting in a desirable reduction of its original hydrophobic behavior. Particulars of the treatment appear among the examples of my prior application Ser. No. 187,747, now Patent 3,309,301.

Other synthetic filter membranes which were tested included a 10 m$\mu$ membrane known in the art as Graver "Hisep" membrane. It proved operative when paired with a selective membrane of less than 7 m$\mu$ pore size.

Methods of making filter membranes and their composition are disclosed in German Patents 805,039 and 913,646.

Filter membranes of extremely small pore size may be used as B membranes, as shown in examples given further below. The "Hisep" membrane of 10 m$\mu$ proved operative, as did cellophane having a pore size of 3 to 7 m$\mu$.

Ion selective membranes are commercially available in many different compositions. Their manufacture has been disclosed in the patent literature. Practically all of the present commercially available ion selective membranes are of a pore size between 2 and 10 m$\mu$, the most commonly occurring pore size being between 6 and 7 m$\mu$.

Among the membranes tested were "Amfion" membranes C–60, C–103 (cationic) and A–60 (anionic). These membranes are basically polyethylene/styrene copolymers sulfonated or quaternized as the case may be.

"Nepton" membranes CR–61 and AR 111–A. The CR–61 membrane material is a styrene divinyl benzene copolymer with sulfonic ion exchange groups thereon and is a cation exchange membrane (U.S. Patent 2,731,411). The AR 111–A membrane is a styrene divinyl benzene, vinyl pyridine anion exchange membrane (U.S. Patent 2,860,097).

Further membranes which were tested were composed of phenolsulfonic acid formaldehyde resin (U.S. Patent 2,636,851). These membranes were relatively rigid and somewhat brittle. They do not lend themselves to flexing.

Other ion selective membranes suited for practicing the invention are described in the 1957 issue of Symposium of Saline Water Conversion, U.S. Department of the Interior, pp. 284 to 289.

EXAMPLE

Example 1.—An apparatus corresponding to FIG. 1 was tested with a single membrane group. The membrane had an active exposed surface of 50 mm. in width and 60 mm. in height and were spaced 3 mm. apart from one another and from the platinum electrodes.

The B membrane was an "Amfion C–103" cation membrane and the A membranes were "S & S Ultraflex–A medium" membranes. The discharge ducts 25 extended to a height of 200 mm. above the top of the chambers 15 and 20 mm. above the bottom of the collecting chamber 27. The collecting chamber was vented at the top through a piece of filter membrane 29.

Saline water of a resistivity of 1000 ohms cm. was passed through the apparatus in an upward direction at a rate of 100 cc./min. and the outflow duct 20, 21 from the raw liquid chambers 15 was adjusted to produce a total outflow from ducts 25, by leakage and in the absence of an electric current, of 0.3 cc./min.

Application of a DC potential of 12.5 volts produced a current of 62 ma. As a result of the current flow the liquid level in one of the ducts 25 receded while the other duct 25 produced deionized water of 148,000 ohms cm. resistivity at an initial rate rate of 2.1 cc./min.

After 72 hours of operation the flow rate had dropped to 1.7 cc./min. Thereupon the polarity of the electrodes was reversed. The potential of 12.5 v. then resulted in a product rate of 2.0 cc./min. and a product resistivity of 155,000 ohms cm. at an operating current of 60 ma. After 72 hours of further operation the production rate had declined to 1.7 cc./min. Reversal of the current increased the production rate to 2.15 cc./min. at a current of 62 ma. and a product resistivity of 141,000 ohms cm.

Example 2.—An apparatus corresponding to FIG. 1 was tested with three membrane groups, each group composed of a central "Amfion C–103" membrane and two "S & S Ultraflex A very dense" filter membranes.

The membranes had an active exposed surface of 50 mm. in width and 60 mm. in height and the membrane groups were spaced 3 mm. from one another and from the electrodes, respectively. The inlet and outlet ducts 17 and 18 of the raw liquid chambers 15 were manifolded as in FIG. 1.

The saline water to be treated had a resistivity of 300 ohms cm. and was passed through the apparatus at a rate of 150 cc./min. The operating potential of 39 volts produced a current of 108 ma.

Initial production: Water of 97,000 ohms cm. resistivity at a rate of 2.6 cc./min.

After three days of operation the product flow rate had declined to 2.05 cc./min., the current had decreased to 82 ma. and the resistivity of the product had increased to 118,000 ohms cm.

The polarity was then reversed. After the first hour of operation the current was 111 ma, the product flow had increased to 2.65 cc./min. and the resistivity of the product water was 94,000 ohms cm.

After three further days of production the flow rate was 2.1 cc./min. Current reversal restored the original flow rate of 2.6 cc./min. at a current of 109 ma. and a product resistivity of 98,000 ohms cm.

The operation was continued for two weeks with current reversals every 72 hours. During the two week period no change from the above pattern of production and resistivity change was observed, and the test was then discontinued.

Example 3.—In the apparatus of Example 1 the cation membrane was replaced by a non-permselective "Hisep" membrane having an average pore size of 10 millimicrons.

Saline water containing a small amount of mud sufficient to make the water cloudy and having a resistivity of 8500 ohms cm. was passed through the chambers 15 at the rate of 100 cc./min. The outflow level of the duct 20 was adjusted to cause water to flow from each duct 25 at the rate of 0.25 cc./min. by leakage and in the absence of an electric current.

Application of a DC potential of 25 volts produced a current of 38 ma. and caused product water to flow at the rate of 4 cc./min. from the duct 25 nearest the anode while the level of the liquid in the other duct 25 receded. Resistivity of the product water 74,000 ohms cm.

After three days of operation the product flow rate had decreased to 3.4 cc./min., the current was 33 ma. and the product resistivity was 79,000 ohms cm. The current was then reversed. One hour after reversal the current was 37 ma., the flow rate 3.9 cc./min. and the resistivity of the product 76,000 ohms cm.

Three days later the product flow rate had decreased to 3.5 cc./min. the current was 34 ma. and the product resistivity was 81,000 ohms cm. One hour after reversal the current was 39 ma., the flow rate 4.1 cc./min. and the resistivity 72,000 ohms cm. The reversal pattern was repeated with substantially unchanged results for two weeks and the test was then discontinued.

Example 4.—In the apparatus of Example 1 the cation membrane was replaced by a non-permselective cellophane membrane.

Slightly cloudy saline water of a resistivity of 6500 ohms cm. was passed through the chambers 15 at the rate of 100 cc./min. The outflow level of the duct 20 was adjusted to cause water to flow from each duct 25 at a rate of 0.25 cc./min. by leakage and in the absence of an electric current.

Application of a DC potential produced a current of 43 ma. The product flow from the duct nearest the anode was 1.2 cc./min. and the resistivity of the product liquid was 129,000 ohms cm.

After three days of operation the current had declined to 36 ma. the flow to 1 cc./min. and the resistivity has increased to 135,000 ohms cm.

The current was reversed. Three hours after reversal the current was 44 ma., the flow rate was 1.3 cc./min. and the product resistivity was 126,000 ohms cm.

After three further days of operation the current was 37 ma., the flow rate 1 cc./min. and the product resistivity was 138,000 ohms cm.

Upon current reversal the current was 43 ma., the production rate 1.2 cc./min. and the product resistivity 131,000 ohms cm. Continued periodic current reversals every 72 hours produced no noticeable deviation from the foregoing pattern and after two weeks the test was discontinued.

Comment and evaluation: Examples 3 and 4 prove that ions of one polarity carry a larger amount of solvent with them than ions of the opposite polarity. The product liquid is withdrawn from the chamber 15 nearest the anode and cations carry a larger amount of solvent through the filter membrane A, which is first encountered by the cations, into the product chamber 23 than is removed from the chamber 23 by the anions moving in the opposite direction.

In the event the membrane B is permselective its effective pore size is even smaller than that of the "Hisep" membrane (Example 3) or of the cellophane membrane (Example 4) resulting in higher current efficiency and improved operation.

What is claimed is.

1. The process of extracting solvent from an ionic solution by the action of an electric current passing through the solution in a multichamber membrane cell, the process comprising the steps of passing ions of a certain polarity of said solution first from a first chamber through a first membrane into a second chamber, then from the second chamber through a second membrane into a third chamber, and thence through a third membrane into a fourth chamber, in which the first and the third membranes are of a larger effective pore size than the second membrane so as to pass the ions in more highly solvated condition through the first and the third membrane than through the second membrane; restricting the passage of ions of the opposite polarity at least through said second membrane; removing solvent product from said second chamber; reversing the direction of the electric current; and upon reversal supplying ionic solution into the fourth chamber and removing solvent product from said third chamber.

2. The process of extracting solvent from an ionic solution by the action of an electric current passing through the solution in a multichamber membrane cell, the process comprising the steps of passing ions of a certain polarity of said solution first from a first chamber through a first membrane into a second chamber, then from the second chamber through a second membrane into a third chamber, and thence through a third membrane into a fourth chamber, in which the first and the third membranes are of a larger effective pore size than the second membrane so as to pass the ions in more highly solvated condition through the first and the third membrane than through the second membrane; restricting the passage of ions of the opposite polarity at least through said second membrane; removing solvent product from said second chamber; reversing the direction of the electric current; and upon reversal supplying ionic solution into the fourth chamber and removing solvent product from said third chamber; and providing a force for urging into physical contact the two membranes bordering the chamber from which solvent product is being withdrawn.

3. The process of extracting solvent from an ionic solution by the action of an electric current passing through the solution in a multichamber membrane cell, the process comprising the steps of passing ions of a certain polarity of said solution first from a first chamber through a first membrane into a second chamber, then from the second chamber through a second membrane into a third chamber, and thence through a third membrane into a fourth chamber, in which the first and the third membranes are of a larger effective pore size than the second membrane so as to pass the ions in more highly solvated condition through the first and the third membrane than through the second membrane; restricting the passage of ions of the opposite polarity at least through said second membrane; removing solvent product from said second chamber; reversing the direction of the electric current; and upon reversal supplying ionic solution into the fourth chamber and removing solvent product from said third chamber and maintaining a hydrostatic pressure unbalance such as to urge into physical contact the two membranes bordering the chamber from which solvent product is being withdrawn.

4. The process of extracting solvent from an ionic solution by the action of an electric current passing through the solution in a multichamber membrane cell, the process comprising the steps of passing ions of one polarity of said solution first from a first chamber through a filter membrane into a second chamber, then from the second chamber through a selectively permeable membrane of ion exchange material into a third chamber, said selectively permeable membrane being passage resistant to ions of the opposite polarity, and thence through a further filter membrane into a fourth chamber; removing solvent product from said second chamber; reversing the direction of the electric current; and, upon reversal, supplying ionic solution into the fourth chamber and removing the solvent product from said third chamber.

5. The process of extracting solvent from an ionic solution by the action of an electric current passing through the solution in a multichamber membrane cell in which there are arranged, in sequence, a filter membrane, a permselective membrane and a further filter membrane, said membranes defining individual chambers within said cell, the process comprising, passing an electric current through said membranes and chambers, and periodically reversing the direction of said current; supplying ionic solution to the chamber which is bordered by the filter membrane first to be traversed by the electric current having regard to the direction then prevailing of the electric current; and withdrawing solvent product from the chamber defined between said last-named filter membrane and the said permselective membrane.

6. The process of extracting solvent from an ionic solution by the action of an electric current passing through the solution in a multichamber membrane cell in which there are arranged, in sequence, a filter membrane, a permselective membrane, and a further filter membrane, said membranes defining individual chambers within said cell, the process comprising, passing an electric current through said membranes and chambers and periodically reversing the direction of said current; supplying ionic solution to the chamber which is bordered by the filter membrane first to be traversed by the electric current, having regard to the direction then prevailing of the electric current; withdrawing solvent product from the chamber defined between said last-named filter membrane and the said permselective membrane; and maintaining in said last-named product producing chamber a hydrostatic pressure which is lower than the hydrostatic pressure prevailing on the other side of at least one of the two membranes which border the said product producing chamber to urge said two membranes together.

7. The process of producing a deionized product liquid from an ionic solution in an electrodialysis cell comprising, between electrodes, a plurality of membranes of two kinds A and B arranged in the order A–B–A–A–B–A, which membranes define chambers in said cell through which chambers the electric current passes in series, the membranes A being of larger effective pore size than the membranes B with respect to ions of a certain polarity, so as to pass more highly solvated ions of said polarity through A membranes than through B membranes; the process comprising, passing ions of said certain polarity of said solution first in one direction through a first A membrane, then through a B membrane and then through a second A membrane; removing solvent product from the chamber defined between said first A membrane and said B membrane; then reversing the direction of the current after a certain period of operation; and upon said reversal removing solvent product from the chamber between said second A membrane and said B membrane while supplying ionic solution into the chamber adjacent said last named product producing chamber.

8. The process of producing a deionized product liquid from an ionic solution in an electrodialysis cell comprising, between electrodes, a plurality of membranes of two kinds A and B arranged in the order A–B–A–A–B–A, which membranes define chamber spaces in said cell through which spaces the electric current passes in series, the membranes A being filter membranes, the membranes B being ion exchange membranes permeable to ions of a certain polarity and passage resistant to ions of the opposite polarity, the process comprising passing ions of a certain polarity of said solution in one direction first through a first A membrane, then through a B membrane, and thereafter through another A membrane; removing solvent product from the space between said first A membrane and said B membrane; reversing the direction of the current after a certain period of operation; and upon said reversal removing solvent product from the space between said other A membrane and said B membrane; and maintaining a hydrostatic pressure imbalance between the respective spaces such as to urge towards physical contact the membranes of the spaces from which product liquid is being withdrawn.

9. The process of producing a deionized product liquid from an ionic solution in an electrodialysis cell comprising, between electrodes, a plurality of membrane groups of three, each group comprising a pair of filter membranes and an ion exchange membrane permeable to ions of a certain polarity and passage resistant to ions of the opposite polarity, said ion exchange membrane lying between said filter membranes, the process comprising supplying solution from which deionized product is to be extracted into spaces between said groups; passing an electric current transverse through a plurality of groups and through the solution therebetween; removing from each group solvent product from the space between the filter membrane and the ion exchange membrane to one side of the ion exchange membrane and combining the products so removed at the one side from the individual groups; reversing the direction of the current after a certain period of operation; and, upon reversal, removing solvent product from the space between the filter membrane and the ion exchange membrane on the other side of the ion exchange membrane and combining the products so removed at the other side from the individual groups.

10. An apparatus for producing a deionized product liquid from an ionic solution, the apparatus comprising, a pair of spaced electrodes, a group of membranes in the space between the electrodes, said group comprising a pair of filter membranes and, between the filter membranes, a central membrane of smaller pore size than either of the filter membranes; means for supplying solution to be treated to at least one of the spaces bordered by a filter membrane, said space being outside said group of three membranes; means for reversibly applying a direct electrical potential to said electrodes; and means for selectively withdrawing liquid product from one or the other of the two spaces adjacent said central membrane, depending on the direction of the electric current resulting from said potential, said last named spaces being devoid of any inflow duct means and receiving liquid exclusively through the bordering membranes.

11. An apparatus for producing a deionized product liquid from an ionic solution, the apparatus comprising, a pair of spaced electrodes, a group of membranes in the space between the electrodes, said group comprising a pair of filter membranes and, between the filter membranes, an ion exchange membrane permeable to ions of one polarity and passage resistant to ions of the opposite polarity; means for supplying solution to be treated to at least one of the spaces bordered by a filter membrane, said last named space being outside the group of three membranes; means for reversibly applying a direct electrical potential to said electrodes; and means for selectively withdrawing liquid product from one or the other of the two spaces adjacent said ion exchange membrane, depending on the direction of the electric current resulting from said potential.

12. An apparatus for producing a deionized product liquid from an ionic solution, the apparatus comprising, a pair of spaced electrodes, a group of membranes in the space between the electrodes, said group comprising a pair of filter membranes and, between the filter membranes, an ion exchange membrane permeable to ions of one polarity and passage resistant to ions of the opposite polarity; means for supplying solution to be treated to at least one of the spaces bordered by a filter membrane, said space being outside the group of three membranes; means for reversibly applying a direct electrical potential to said electrodes; and overflow duct means for withdrawing liquid product from the two spaces between the selective membrane and the respective filter membrane, said overflow duct means being arranged to pass liquid from the respective space, if the liquid pressure exceeds a predetermined value and to retain the liquid in the space when the pressure is less than said value.

13. An apparatus for producing a deionized product liquid from an ionic solution, the apparatus comprising, a pair of spaced electrodes, a group of membranes in the space between the electrodes, said group comprising a pair of filter membranes and, between the filter membranes, an ion exchange membrane permeable to ions of one polarity and passage resistant to ions of the opposite polarity; means for supplying solution to be treated to at least one of the spaces bordered by a filter membrane, said space being outside the group of three membranes; means for reversibly applying a direct electrical potential to said electrodes; duct means including valve means for selectively withdrawing liquid product from one or the other of the two spaces between the selective membrane and the respective filter membrane, depending on the direction of the electric current resulting from said potential.

14. An apparatus for producing a deionized product liquid from an ionic solution, the apparatus comprising, a pair of spaced electrodes, a plurality of membrane groups in the space between the electrodes, each group comprising a pair of filter membranes and, between the filter membranes, an ion exchange membrane permeable to ions of one polarity and passage resistant to ions of the opposite polarity; means for supplying solution to be treated into spaces of the apparatus between said groups; manifold duct means for withdrawing and combining liquid product withdrawn from the spaces of said groups defined by the respective ion exchange membrane and the filter membrane of the group nearer one electrode; and manifold duct means for withdrawing and combining liquid product withdrawn from the spaces of said groups defined by the respective ion exchange membrane and the filter membrane of the group nearer the other electrode.

15. An apparatus as defined in claim 14 in which, further, means are provided for maintaining the hydrostatic pressure in the spaces into which solution is supplied between said groups higher than the pressure in the spaces from which liquid product is being withdrawn so as to urge the membranes bordering the last named spaces towards physical contact.

16. An apparatus for producing a deionized product liquid from an ionic solution, the apparatus comprising, a pair of spaced electrodes, a plurality of membrane groups in the space between the electrodes, each group comprising a pair of filter membranes and, between the filter membranes, an ion exchange membrane permeable to ions of one polarity and passage resistant to ions of the opposite polarity; means for supplying solution to be treated into spaces of the apparatus between said groups; manifold duct means for withdrawing and combining liquid product from the spaces of the groups between the respective ion exchange membrane and the two filter membranes between which the ion exchange membrane lies, the liquid combining manifold lying at a level above the liquid spaces of the apparatus, so as to require a certain hydrostatic pressure to force liquid from the respective product producing space into the manifold, the level being too high for discharge of liquid into the manifold from a non-producing space, as hereinafter defined; and means for reversibly applying a direct electric potential to said electrodes, as a result of which one of said spaces of each group becomes a product producing space before reversal of the polarity of the potential and the other space of each group becomes a product producing space after reversal of the polarity of the potential.

17. An apparatus as defined in claim 16 in which, further, means are provided for maintaining a higher hydrostatic pressure in the spaces into which solution is supplied between said groups than the pressure in the product producing spaces to urge towards physical contact the membranes bordering the product producing spaces.

References Cited

UNITED STATES PATENTS

| 2,863,813 | 12/1958 | Juda et al. | 204—180 |
| 3,017,338 | 1/1962 | Butler et al. | 204—98 |
| 3,341,441 | 9/1967 | Giuffrida et al. | 204—180 |

JOHN H. MACK, *Primary Examiner.*

A. C. PRESCOTT, *Assistant Examiner.*